(12) United States Patent
Lee et al.

(10) Patent No.: US 12,679,330 B2
(45) Date of Patent: Jul. 14, 2026

(54) HYBRID ELECTRIC VEHICLE AND METHOD OF CONTROLLING ENGINE SPEED FOR THE SAME

(71) Applicants: HYUNDAI MOTOR COMPANY, Seoul (KR); KIA CORPORATION, Seoul (KR)

(72) Inventors: Seo Ho Lee, Hwaseong-si (KR); Hyun Jin Park, Busan (KR); Jae Young Choi, Seoul (KR); Kwon Chae Chung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 252 days.

(21) Appl. No.: 18/101,442

(22) Filed: Jan. 25, 2023

(65) Prior Publication Data

US 2024/0083410 A1 Mar. 14, 2024

(30) Foreign Application Priority Data

Sep. 13, 2022 (KR) ........................ 10-2022-0115112

(51) Int. Cl.
*B60W 20/15* (2016.01)

(52) U.S. Cl.
CPC ..... *B60W 20/15* (2016.01); *B60W 2510/0208* (2013.01); *B60W 2510/0638* (2013.01); *B60W 2510/081* (2013.01); *B60W 2540/10* (2013.01)

(58) Field of Classification Search
None
See application file for complete search history.

(56) References Cited

U.S. PATENT DOCUMENTS

| | | | | |
|---|---|---|---|---|
| 6,125,321 A * | 9/2000 | Tabata | .............. | B60W 30/1819 |
| | | | | 318/55 |
| 12,110,006 B2 * | 10/2024 | Rho | ...................... | B60W 10/06 |
| 2004/0046652 A1 * | 3/2004 | Yokoyama | .............. | B60T 13/66 |
| | | | | 340/453 |
| 2013/0130923 A1 * | 5/2013 | Ehrich | ................... | G16B 25/20 |
| | | | | 506/7 |

(Continued)

FOREIGN PATENT DOCUMENTS

| | | | | |
|---|---|---|---|---|
| CN | 114291070 A * | 4/2022 | .............. | B60K 6/24 |
| EP | 2275712 A2 * | 1/2011 | ........... | F16H 61/061 |

(Continued)

OTHER PUBLICATIONS

Google Patents Machine Translation of EP2093119B1 (Year: 2006).*

*Primary Examiner* — Jean Paul Cass
(74) *Attorney, Agent, or Firm* — Lempia Summerfield Katz LLC

(57) ABSTRACT

Disclosed are a hybrid electric vehicle and a method for controlling an engine speed of a hybrid electric vehicle. In particular, the method includes: determining, when an engine on one end and a first motor are directly connected and while driving in a state where an engine clutch is connected and a second motor is connected to the other end, a compensation value based on the difference in the rotational speed of the engine and the second motor when a control entry is caused, which induces the rotational speed mismatch of the engine and the second motor; and compensating an output torque of the first motor based on the compensation value.

13 Claims, 7 Drawing Sheets

(56)     References Cited

U.S. PATENT DOCUMENTS

2013/0311029 A1 *  11/2013  Tagawa ................. B60W 10/06
                                                    180/65.265
2018/0119808 A1 *   5/2018  Miller .................... B60W 20/15
2018/0290659 A1    10/2018  Tsukada et al.
2024/0109538 A1 *   4/2024  Park ...................... B60W 10/08

FOREIGN PATENT DOCUMENTS

EP          2468599 A1 *  6/2012   ........... B60G 17/016
EP          2093119 B1 *  8/2014   ........... B60W 10/06
JP          4877382 B2 *  2/2012   ............ B60K 6/445
JP       2019093930 A      6/2019
JP       2019151156 A      9/2019
JP       2021062758 A      4/2021
JP       2021102361 A      7/2021
KR        101964786 B1     4/2019

* cited by examiner

HYBRID ELECTRIC VEHICLE AND METHOD OF CONTROLLING ENGINE SPEED FOR THE SAME

CROSS REFERENCE TO RELATED APPLICATION

The present application claims priority to Korean Patent Application No. 10-2022-0115112, filed on Sep. 13, 2022, the entire contents of which are incorporated herein by reference.

FIELD

The present disclosure relates to a hybrid electric vehicle and a method of controlling an engine speed of the vehicle.

BACKGROUND

Recently, eco-friendly electrical vehicles have become popular as people have become more aware of preserving the environment. Such eco-friendly electrical vehicles include electric vehicles such as hybrid electric vehicles (HEV) and fully electric vehicles (EV).

In the case of the hybrid electric vehicle, a motor may be provided with an engine as a driving source, and the engine and the motor may be disposed at both ends of the engine clutch, respectively, depending on the structure of the powertrain. In such designs, the engine and the motor may be connected or disconnected depending on the connection state of the engine clutch. If the engine clutch is in locked-up state, the engine and the motor are connected so that the engine shaft and the motor shaft rotate together. If not, the engine and the motor are disconnected.

However, in the situation where the driving mode changes, the rotational speeds of the engine and the motor may not match, and in this case, there may be a torsion on the shaft between the engine and the motor due to the difference in the rotational speed. In the shaft torsional event, the driver may feel that the steering system is not working or controlled as intended, and the durability of the vehicle may be degraded.

Matters described as the related art are provided merely for promoting understanding for the background of the disclosure, and should not be taken as the prior art already known to a person having ordinary knowledge in the art.

SUMMARY

The present disclosure has been made in view of the above problems, and it is an object of the present disclosure to provide a hybrid electric vehicle and a method of controlling an engine speed of the hybrid electric vehicle so as to alleviate torsion of shaft between an engine and a motor by controlling the rotational speed of the engine in the case of mismatch in rotational speed of the engine and the motor connected to the engine through an engine clutch.

The technical objects to attain in the present disclosure are not limited to the above-described technical objects, and other technical objects which are not described herein should become apparent to those having ordinary skill in the art from the following description.

According to an aspect of the present disclosure, a method for controlling an engine speed of a hybrid electric vehicle includes: determining when an engine on one end and a first motor are directly connected while driving in a state where an engine clutch is locked-up and a second motor is connected to the other end; calculating a compensation value based on the difference in rotational speed of the engine and the second motor when a cause of control entry occurs, which induces the rotational speed mismatch of the engine and the second motor; and compensating an output torque of the first motor based on the compensation value.

In one embodiment, the cause of control entry may include at least one of a request for stopping a fuel injection or a request for starting a fuel injection.

In another embodiment, the cause of control entry may include a change in an accelerator pedal control state.

In one embodiment, the compensation value may be determined by further considering the cause of control entry.

In one embodiment, the compensation value may be determined by further considering a predetermined value to correspond to a plurality of sections, which is the difference between the rotational speed of the engine and the rotational speed of the second motor.

In one embodiment, the step of determining the compensation value may further include: storing, in the case of the difference in rotational speed exceeding a second reference value which is greater than a predetermined first reference value during an initial engine speed control for each of the causes of control entry, the torque of the first motor such that the difference in rotational speed is less than or equal to the first reference value and then determining the stored torque as the compensation value.

In one embodiment, the method may further include the step of compensating the output torque of the first motor additionally so that the difference in rotational speed is less than or equal to the first reference value when the difference in rotational speed exceeds the second reference value which is greater than the predetermined first reference value as a result of compensating the output torque of the first motor by applying the compensation value.

In one embodiment, the method may further include the step of terminating an output torque compensation of the first motor when a locked-up state of the engine clutch is opened.

According to an aspect of the present disclosure, a hybrid electric vehicle includes: an engine clutch, of which a first motor directly connected to an engine at one end and a second motor connected to the other end; and a controller that first determines the compensation value based on a difference in the rotational speed between the engine and the second motor when a cause of control entry is occurred, which induces the rotational speed mismatch of the engine and the second motor. The controller is configured to compensate an output torque of the first motor based on the compensation value.

In one embodiment, the cause of control entry may include at least one of the causes: a request for stop a fuel injection and a request for start a fuel injection.

In one embodiment, the cause of control entry may include a change in an accelerator pedal control state.

In one embodiment, the compensation value may be determined by further considering the cause of control entry.

In one embodiment, the compensation value may be determined by further considering a predetermined value to correspond to a plurality of sections, which is a difference between the rotational speed of the engine and the rotational speed of the second motor.

In one embodiment, when the difference in rotational speed exceeds a second reference value which is greater than a predetermined first reference value during an initial engine speed control for each of the causes of control entry, the controller may store the torque of the first motor such that the difference in rotational speed is less than or equal to the first reference value and determine the stored torque as the compensation value.

In one embodiment, the controller compensates the output torque of the first motor so that the difference in rotational speed is less than or equal to the first reference value when the difference in rotational speed exceeds the second reference value which is greater than the predetermined first reference value as a result of compensating the output torque of the first motor by applying the compensation value.

For example, the controller may terminate an output torque compensation of the first motor when a locked-up state of the engine clutch is opened.

The effects of the present disclosure are not limited to those effects mentioned above, and other effects not mentioned may be clearly understood by those having ordinary skill in the art from the description of the present disclosure.

According to various embodiments as described above, in the case of a rotational speed of an engine and a motor connected to an engine through an engine clutch being mismatched in a hybrid electric vehicle, by controlling the rotational speed of the engine through a separate motor directly connected to the engine, the rotational speed of the engine and the motor connected thereof connected through the engine clutch may be matched. The result of such solution is that the feeling of steering system not working or controlled as intended is alleviated, and the durability of the vehicle may be improved due to lessening of the torsion of shaft experienced between the engine and the motor.

Advantages which may be obtained in this specification are not limited to the aforementioned advantages, and various other advantages may be evidently understood by those having ordinary skill in the art to which the present disclosure pertains from the following description.

DETAILED DESCRIPTION

Figure 1:
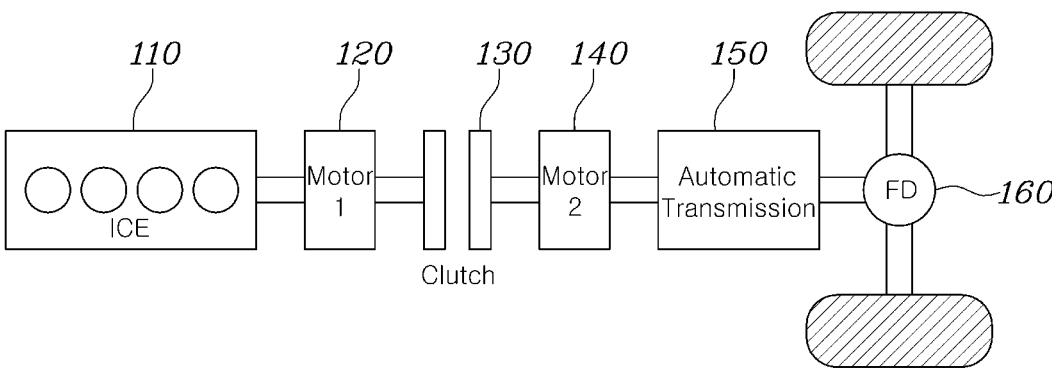
FIG. 1 a diagram illustrating a powertrain configuration of a hybrid electric vehicle according to an embodiment of the present disclosure.

The present disclosure is described in greater detail with reference to the accompanying drawings. In describing the present disclosure, for ease of understanding, the same reference numerals are used to denote the same components throughout the drawings, and repetitive description on the same components are omitted. In the following description, with respect to constituent elements used in the following description, suffixes "module" and "unit" are given in consideration of only facilitation of description and do not have meaning or functions discriminated from each other. In addition, in the following description of the embodiments disclosed in the present specification, a detailed description of known functions and configurations incorporated herein is omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and spirit of the present disclosure.

Terms such as "first" and "second" may be used to describe various components, but the components should not be limited by the above terms. In addition, the above terms are used only for the purpose of distinguishing one component from another.

It should be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise. When a component, device, element, or the like of the present disclosure is described as having a purpose or performing an operation, function, or the like, the component, device, or element should be considered herein as being "configured to" meet that purpose or to perform that operation or function.

In the present application, it should be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

Further, terms "unit" or "control unit" forming part of the names of a motor control unit (MCU), a hybrid control unit (HCU), etc. are merely terms that are widely used in the naming of a controller for controlling a specific function of a vehicle and should not be construed as meaning a generic function unit. For example, each controller is a communication device that communicates with other controllers or sensors to control the function that is responsible for, a memory that stores an operating system or logic commands and input and output information, and one or more processor that performs determination, calculation, decision, and the like, which is necessary for the control the function that is responsible therefor.

Prior to the description with reference to the method for controlling the engine speed according to an embodiment of the present disclosure, the structure and control system of the hybrid electric vehicle applicable to embodiments are explained first.

FIG. 1 is diagram illustrating a powertrain configuration of a hybrid electric vehicle according to an embodiment of the present disclosure.

In FIG. 1, the powertrain of the hybrid electric vehicle includes two motors 120 and 140, which are mounted between an internal combustion engine (ICE) 110 and an automatic transmission 150, and an engine clutch 130, which employs a parallel type of hybrid system. Such a parallel type of hybrid system is also called a transmission mounted electric drive (TMED) hybrid electric system since a motor 140 is always connected to an input side of the automatic transmission 150.

In one embodiment, the first motor 120 of the two motors 120 and 140 is disposed between the engine 110 and one end of the engine clutch 130, and an engine shaft of the engine 110 and a first motor shaft of the first motor 120 are directly connected to each other to rotate together at all times.

One end of a second motor shaft of the second motor 140 may be connected to the other end of the engine clutch 130, and the other end of the second motor shaft may be connected to the input terminal of the automatic transmission 150.

The second motor 140 has a greater output than the first motor 120, and the second motor 140 may perform as a drive motor. In addition, the first motor 120 may perform as a starter motor to crank the engine 110 when the engine 110 starts. The power generation may be performed with the power of the engine 110 while the engine 110 is in operation. When the engine is off, the rotational energy of the engine 110 can be recovered through power generation.

As shown in FIG. 1, when a driver depresses an accelerator pedal after starting (for example, HEV Ready), in the hybrid electric vehicle having the powertrain, the second motor 140 may be driven using the electrical power of a battery (not shown) in a state in which the engine clutch 130 is opened. Accordingly, the power of the second motor 140 passes through the automatic transmission 150 and a final drive (FD) 160 to move a wheel (i.e., EV mode). When a vehicle is gradually accelerating and a larger driving force is required, the first motor 120 may operate to crank the engine 110.

After the engine 110 is started and the difference in rotational speed between the engine 110 and the second motor 140 is within a predetermined range, the engine clutch 130 is engaged, and the engine 110 and the second motor 140 may be rotated together (i.e., a transition from EV mode to HEV mode). Accordingly, through a torque blending process, the output of the second motor 140 is decreased, and the output of the engine 110 is increased so that the driver's demand torque may be satisfied. In the HEV mode, most of the demand torque may be satisfied from the engine 110. The difference between engine torque and the demand torque may be compensated through at least one of the first motor 120 and the second motor 140. For example, when the engine 110 outputs a torque higher than the demand torque considering the efficiency of the engine 110, either the first motor 120 or the second motor 140 may generate power to the extent of the redundancy of the engine torque. When the engine torque exceeds the demand torque, at least one of the first motor 120 and the second motor 140 may output the deficit torque.

In a predetermined engine off condition, such as a deceleration of the vehicle, the engine clutch 130 may be opened, and the engine 110 may be stopped (i.e., a transition from HEV mode to EV mode). In such cases, by using the driving force of the wheel, a battery may be recharged through the second motor 140, which is referred to as a braking energy regeneration or regenerative braking.

In general, the automatic transmission 150 may use a discrete variable transmission or a multiple-disc clutch, such as a dual clutch transmission (DCT).

Figure 2:
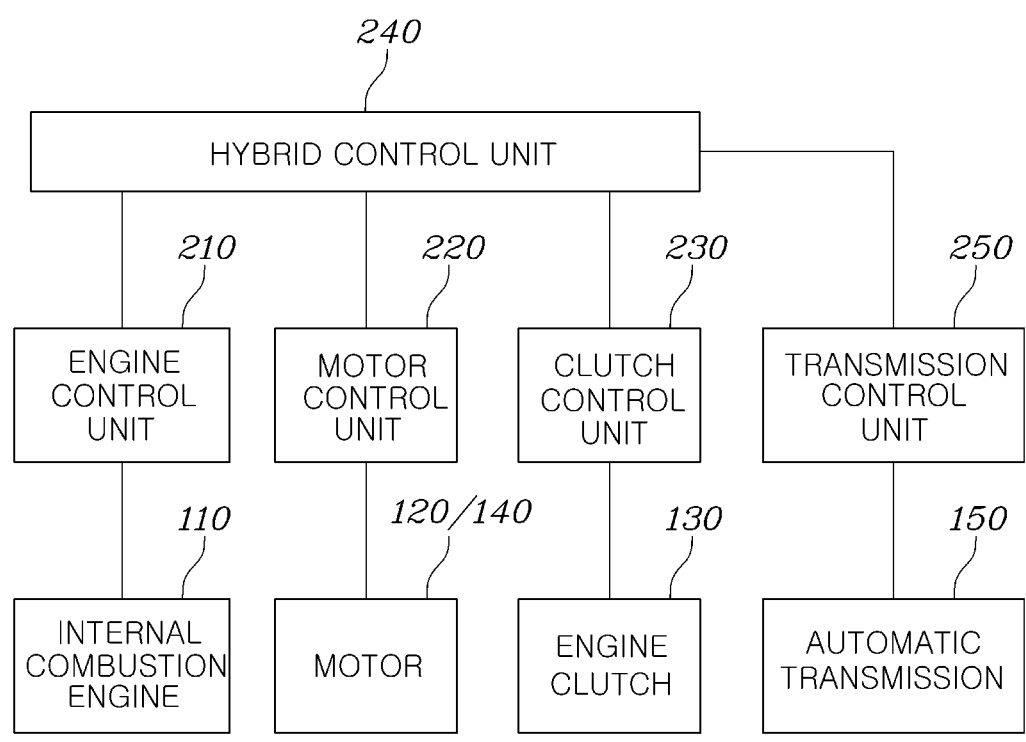
FIG. 2 is a view illustrating a control system of a hybrid electric vehicle according to an embodiment of the present disclosure.

FIG. 2 illustrates a control system of a hybrid electric vehicle according to an embodiment of the present disclosure.

With reference to FIG. 2, the engine 110 of the hybrid vehicle to which embodiments of the present disclosure can be applied may be controlled by an engine control unit 210. The first motor 120 and the second motor 140 may be controlled by a motor control unit (MCU) 220, and the engine clutch 130 may be controlled by a clutch control unit 230. Here, the engine control unit 210 is also referred to as an engine management system (EMS). In addition, the automatic transmission 150 may be controlled by a transmission control unit 250.

The MCU 220 transmits a pulse width modulation (PWM) control signal to a gate drive unit (not shown) based on a motor angle, phase voltage, phase current, demand torque, and the like of each of the motors 120 and 140. The gate drive unit may control an inverter (not shown) that drives each of the motors 120 and 140 accordingly.

Each control unit may be connected to a hybrid control unit (HCU) 240 that controls the overall powertrain, including a mode switching process. The HCU 240 is an upper-level control unit of each control unit as each control unit may provide the HCU 240 with the information required to control the engine clutch when shifting gears or changing driving mode, and/or the information required to stop the engine according to the control of the HCU 240 or perform an operation according to a control signal.

For example, the HCU 240 may determine whether to perform switching between EV-HEV modes or CD-CS mode (in the case of PHEV) according to the driving state of the vehicle. To this end, the HCU determines when the engine clutch 130 is opened and performs a hydraulic control when opened. In addition, the HCU 240 may determine a state (lock-up, slip, open, etc.) of the engine clutch 130, and may control the timing of stopping the fuel injection of the engine 110. In addition, the HCU may send a torque command for controlling the torque of the first motor 120 to the MCU 220 for an engine stop control, thereby controlling the recovery of the engine rotational energy. In addition, the HCU 240 determines the state of each of the drive sources 110, 120, and 140 to satisfy the demand torque, and determines the required drive force to be shared by each of the drive sources 110, 120, and 140 according to the respective drive source, in which the respective drive source may send the torque command to the control units 210 and 220.

It should be apparent to those having ordinary skill in the art that the above-mentioned connection relationship and the function and classification of each control unit is exemplary and is non-limited by its name. For example, the function of the HCU 240 may be provided by any one of the other control units, or may be provided in a distributed manner in two or more of the other control units.

It should be also apparent to those having ordinary skill in the art that the aforementioned configurations of FIGS. 1 and 2 are only examples of the hybrid electric vehicle, and the hybrid electric vehicle applicable to the embodiment is not limited to such a configuration.

According to an embodiment of the present disclosure, in the case of the rotational speeds of the engine 110 and the second motor 140 mismatch, the rotational speed of the engine 110 and the rotational speed of the second motor 140 are adjusted to correspond to each other by compensating the output torque of the first motor 120, and thus, it is proposed that the torsion of shaft between the engine 110 and the second motor 140 are alleviated.

Figure 3:
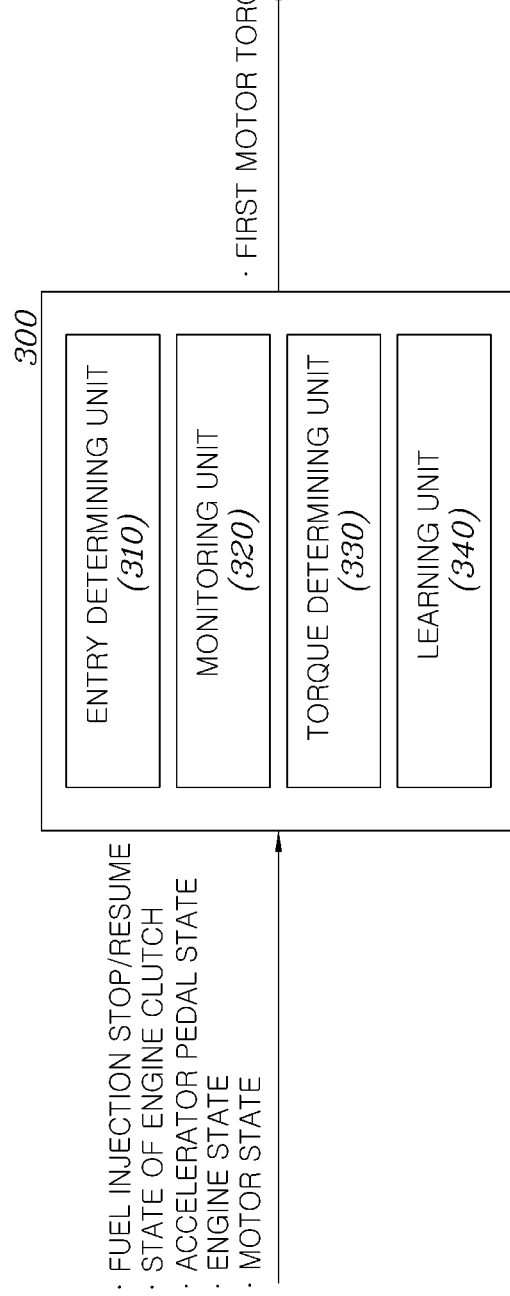
FIG. 3 is a view illustrating an engine speed controller configuration of a hybrid electric vehicle according to an embodiment of the present disclosure.

FIG. 3 shows an example of an engine speed control unit configuration of a hybrid electric vehicle according to an embodiment of the present disclosure.

Referring to FIG. 3, an engine speed control unit 300 according to an embodiment of the present disclosure may include a request for fuel injection stop (Fuel Cut) or start (Rewet), state of engine clutch 130, state of acceleration pedal, and state of engine 110, and state of motors 120 and 140 as input information. In addition, an engine speed control unit 300 may control the torque of the first motor 120 based on the input information and the determination thereof.

Here, the request for fuel injection stop or start may be generated according to changes in a driving mode or a powertrain mode, but it is not necessarily limited thereto. For example, when entering a passive mode, the request for fuel injection stop may be generated, and when ending the passive mode, the request for fuel injection start may be generated. Here, the passive mode may refer to a mode in which fuel injection is stopped while the engine clutch 130 is locked-up, the engine is driven by torque transmitted through the wheel, and the vehicle battery may be entered when there is no required torque of the driver, and the vehicle battery is overcharged.

On the other hand, the state of the engine clutch 130 may include an open, a lock-up, and a slip and may be divided into a lock-up state and other states in embodiments according to the present disclosure. In addition, the state of the engine clutch 130 may include a process of transition to a target state as well as open, a lock-up, and a slip of the current state.

The accelerator pedal state may include an on and off state according to an operation of the accelerator pedal and may include a degree of pedal opening according to an embodiment.

In addition, the state of the engine 110 and the motors 120 and 140 may include respective rotational speeds and whether operated normally, the rotational speed of the motors 120 and 140 may be derived based on sensor detection results such as a resolver, a resolver, or a crankshaft position sensor (CKP).

Each of the above input information may be individually provided from the engine control unit 210, the MCU 220, and the clutch control unit 230, or may be provided by an upper control unit such as the HCU 240.

Meanwhile, the torque control of the first motor 120 by the engine speed control unit 300 may be performed by transmitting a torque command to the MCU 220.

In the implementation, the engine speed controller 300 may be efficiently implemented as a function of the MCU 220 or the HCU 240 which is an upper controller thereof, but this is an example and is not necessarily limited thereto.

Hereinafter, a detailed configuration of the engine speed control unit 300 is explained.

The engine speed control unit 300 may include an entry determining unit 310, a monitoring unit 320, and a torque determining unit 330, and may further include a learning unit 340.

First, the entry determining unit 310 determines the engine speed entry according to whether the cause of control entry that induces a mismatch between the engine 110 and the second motor 140 in the lock-up state of the engine clutch based on the input information described above.

For example, the entry determining unit 310, when driving in the lock-up state of the engine clutch 130 or when the request for start and stop the fuel injection is generated or when an accelerator pedal control state is changed, it may be deemed that the control entry cause is generated, and thus, the engine speed control unit 300 can be entered to the engine speed control. A detailed description of the cause of entry is explained with reference to FIGS. 4A to 4C.

Figure 4A:
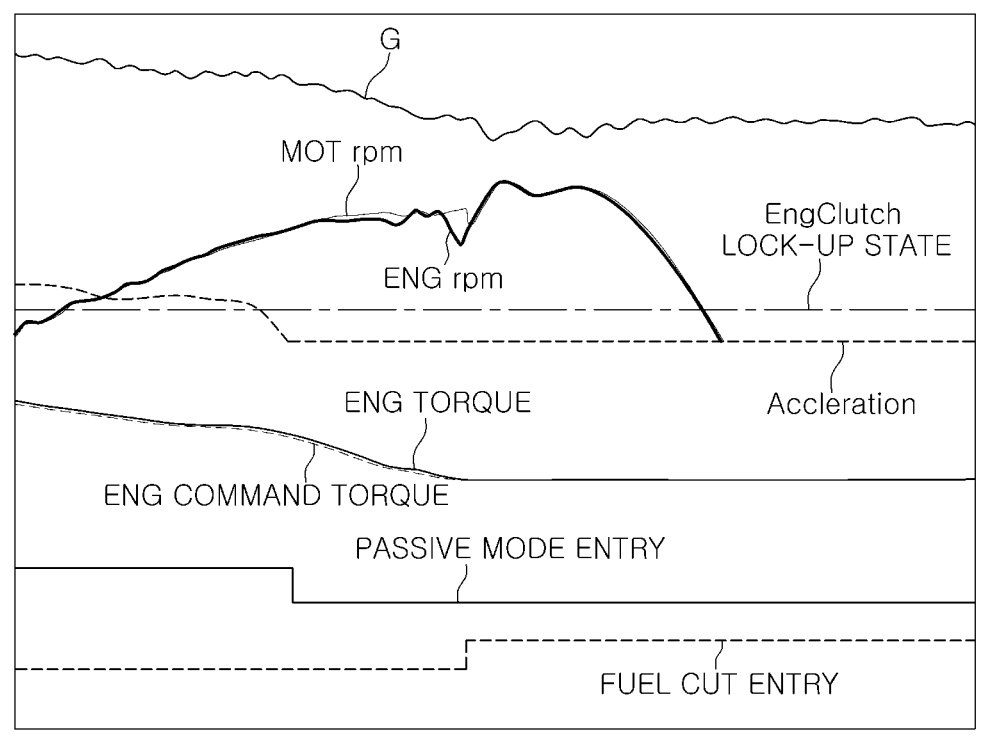
FIGS. 4A to 4C are diagrams describing a cause of an engine speed control according to an embodiment of the present disclosure.
Figure 4B:
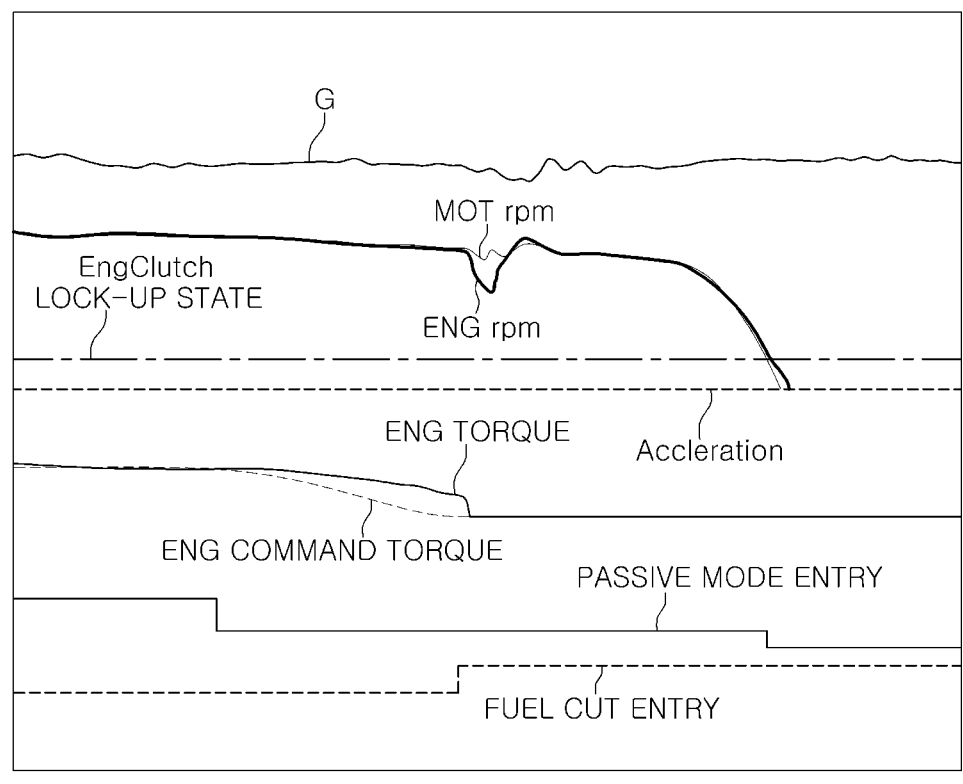
Figure 4C:
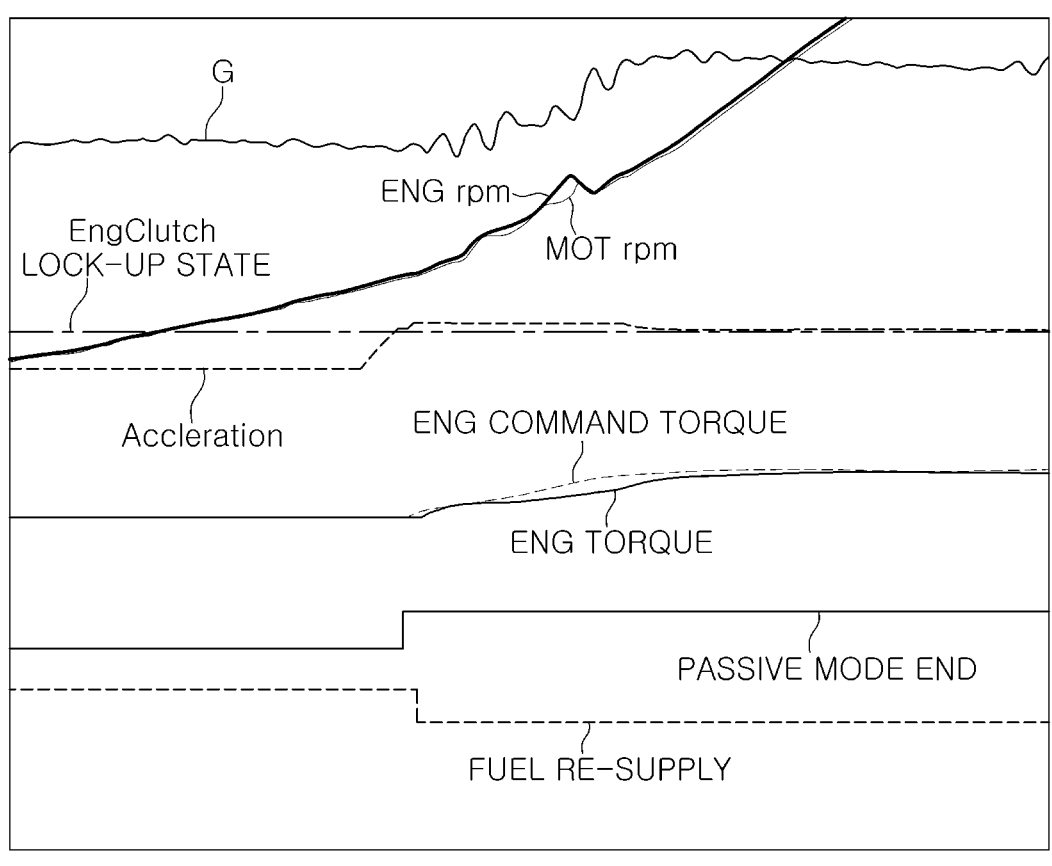

FIGS. 4A to 4C show diagrams describing a cause of an engine speed control according to an embodiment of the present disclosure.

FIGS. 4A and 4B illustrate various changes such as an entry of a passive mode, fuel injection stop and re-supply, acceleration "G", a second motor rotational speed "MOT rpm," and engine rotational speed "ENG rpm".

First, referring to FIG. 4A, when entering the passive mode in the lock-up state of the engine clutch 130, the torque through the wheel is transmitted to the engine 110 to drive the engine 110. In this case, the rotational speed of the engine 110 is reduced due to the frictional torque, and thus, a difference in the rotational speed of the engine 110 and the second motor 140 is generated. In this case, the torsion of shaft between the engine 110 and the second motor 140 is generated due to the difference in rotational speed, so that the intervention of the engine speed control is required.

FIG. 4B shows a state in which the torque of the engine 110 side is sharply reduced when fuel injection is stopped while the torque of the engine 110 is generated, so that the rotational speed of the engine 110 is reduced. Due to the decrease in the rotational speed of the engine 110, a difference occurs in the rotational speed of the engine 110 and the second motor 140, and accordingly, the torsion of the shaft occurs between the engine 110 and the second motor 140, so that the intervention of the engine speed control is required.

FIG. 4C shows a state in which when fuel injection resumes due to the release of passive mode entry in the state of the engine clutch 130 and causes ignition of the engine 110, the torque on the engine 110 increases rapidly, increasing the rotational speed of the engine 110. Due to the increase in the rotational speed of the engine 110, a difference occurs in the rotational speed of the engine 110 and the second motor 140, and accordingly, the torsion of the shaft occurs between the engine 110 and the second motor 140, so that the intervention of the engine speed control is required.

Meanwhile, although not shown in FIGS. 4A and 4B, the cause of the control entry may include a change in accelerator pedal control. Even when the rotational speed of the engine 110 increases momentarily when the accelerator pedal is turned on or the rotational speed of the engine 110 decreases momentarily when the accelerator pedal is turned off, a difference in rotational speed from the second motor 140 may occur, and to respond to the resulting torsion of the shaft, the entry determining unit 310 may initiate the engine speed control when the accelerator pedal operation is changed.

On the other hand, the entry determining unit 310 may terminate the engine speed control when the lock-up state of the engine clutch 130 is opened while controlling the engine speed.

To continue to explain the configuration of the engine speed control unit 300 shown in FIG. 3, the monitoring unit 320 monitors the rotational speed of the engine 110 based on the rotational speed of the second motor 140. The monitoring unit 320 may request the torque determining unit 330 to compensate for the output torque of the first motor 120 when the difference in rotational speed between the engine 110 and the second motor 140 exceeds a predetermined first reference value during monitoring the rotational speed of the engine 110. In this case, the first reference value may act as a reference for determining the occurrence of a mismatch in rotational speed between the engine 110 and the second motor 140, and may be, for example, 0 rpm.

The torque determining unit 330 may determine the compensation value based on the rotational speed of the engine 110 and the second motor 140 when the cause of control entry occurs, and may compensate the output torque of the first motor 120 based on the determined compensation value. For example, when a difference in the rotational speed between the engine 110 and the second motor 140 exceeds the first reference value, the determined compensation value is applied to compensate the output torque of the first motor 120. The first motor 120 is directly connected to the engine 110, which is positioned together on one end of the engine clutch 130 and always rotate together, thereby adjusting the rotational speed of the engine 110 through the output torque compensation of the first motor 120. In addition, a matching rate of rotational speed between the engine 110 and the first motor 120 is improved compared to when the first motor 120 is connected to the engine 110 through a belt and a pulley, and since a belt slip does not occur, control may be performed more accurately even during a sudden change in torque.

In this case, the predetermined compensation value may be determined by further considering each cause of the control entry and may be determined according to the predetermined value to correspond to each cause of the control entry. For example, when the engine speed control is performed according to a request for stop the fuel injection, the rotational speed of the engine 110 is slower than that of rotational speed of the second motor 140, and thus, in order to increase the rotational speed of the engine 110, the first motor 120 may be set to a value (i.e., a positive torque value) to output a discharging torque in the same direction as the rotating direction of the engine 110 as a compensation torque. When the engine speed control is performed according to the request for resuming the fuel injection, the rotational speed of the engine 110 is faster than that of the rotational speed of the second motor 140, and thus, in order to reduce the rotational speed of the engine 110, the first motor 120 may be set to a value (i.e., a negative torque value) to output the charging torque in the reverse direction of the engine 110 as a compensation torque. In addition, not only the direction of the torque but also the size of the torque may be set to correspond to each cause of entry. Accordingly, the engine speed control, which is optimized to each cause of control entry, may be performed.

In addition, the compensation value may be set to correspond to a plurality of sections of differences in rotational speed between the engine 110 and the second motor 140. For example, the compensation value may be set as shown in the table below.

TABLE 1

|  | Δrpm | 0 | 30 | 50 | 70 | 100 |
|---|---|---|---|---|---|---|
| Request to stop fuel injection | Compensation value | a1 | a2 | a3 | a4 | a5 |
| Request to start fuel injection | Compensation value | b1 | b2 | b3 | b4 | b5 |

Here, $\Delta$rpm refer to a difference in rotational speed of the engine 110 and the second motor 140, a1 to a5 refer to compensation values set for each section of the rotational speed of the engine 110 when the cause of control entry is a request for stop the fuel injection, and b1 to b5 refer to compensation values set for each section of the rotational speed of the engine 110 when the cause of control entry is a request for resume the fuel injection. When a difference in the rotational speed between the engine 110 and the second motor 140 exceeds the first reference value, the output torque of the first motor 120 may be compensated by outputting a compensation value according to each cause of entry by the difference in current rotational speed.

When a mismatch of rotational speed between the engine 110 and the second motor 140 occurs, the output torque of the first motor 120 is compensated in advance according to the predetermined compensation value, so that the engine 110 and the second motor 140 may preemptively respond to a torsion and twisting.

Meanwhile, setting the compensation as described above may be performed through a learning unit 340. When the learning unit 340 determines that the difference between the rotational speeds of the engine 110 and the second motor 140 exceeds a predetermined second reference value as a result of monitoring, the output torque of the first motor 120 may be compensated to be less than or equal to the reference value, and a torque value corresponding to the output torque of the first motor 120 at the time of the compensation may be set as the compensation value. In addition, the learning unit 340 may be set to correspond to the compensation value to the cause of control entry at the time of compensation and may set to the compensation value as the torque value corresponding to a plurality of sections of difference in the rotational speed between the engine 110 and the second motor 140 in the compensation process may be set as a compensation value. In addition, as shown in Table 1 above, the learning unit 340 may store a compensation value corresponding to the difference in the rotational speed of the engine 110 and the second motor 140 as a map to be referred to when compensating the output torque of the first motor 120 of the torque determining unit 330. Setting the compensation value as described above may be performed during the initial engine speed control for each cause of speed control but this is an exemplary and may be performed in other methods, such as updating the compensation value for every control.

On the other hand, the torque determining unit 330 compensates for the output torque of the first motor 120 by applying the compensation value, but the difference between the rotational speeds of the engine 110 and the second motor 140 may exceed the predetermined second reference value. In this case, the output torque of the first motor 120 may be additionally compensated so that the difference in rotational speed between the engine 110 and the second motor 140 is less than or equal to the first reference value through a feedback control. In the case of the rotational speed of the engine 110 and the second motor 140 do not match even with the primary compensation according to a predetermined compensation value, the effect of controlling the engine speed by performing the additional compensation control as described above to doubly respond to torsion and twisting may be increased.

On the other hand, in the learning process of the above-described compensation value and the additional compensation process of the output torque of the first motor 120, the second reference value, in engine speed control, is a limit value of the allowable difference in rotational speed between the engine 110 and the second motor 140 used as a criteria for determining whether the control purpose is achieved. When the difference in rotational speed is less than or equal to the second reference value, the purpose of the engine speed control is treated as being achieved, and the standby state may be entered, or the control may be terminated. Contrarily, the first reference value acts as a reference for determining whether a difference in rotational speed between the engine 110 and the second motor 140 occurs, and whether to compensate the output torque of the first motor 120 is determined according to the first reference value. In addition, it is appropriate that the second reference value is greater than or equal to the first reference value. The above-described engine speed control process is shown in a flowchart as shown in FIG. 5.

FIG. 7 a flowchart showing an example of an engine stop control process according to an embodiment of the present disclosure.

Figure 5:
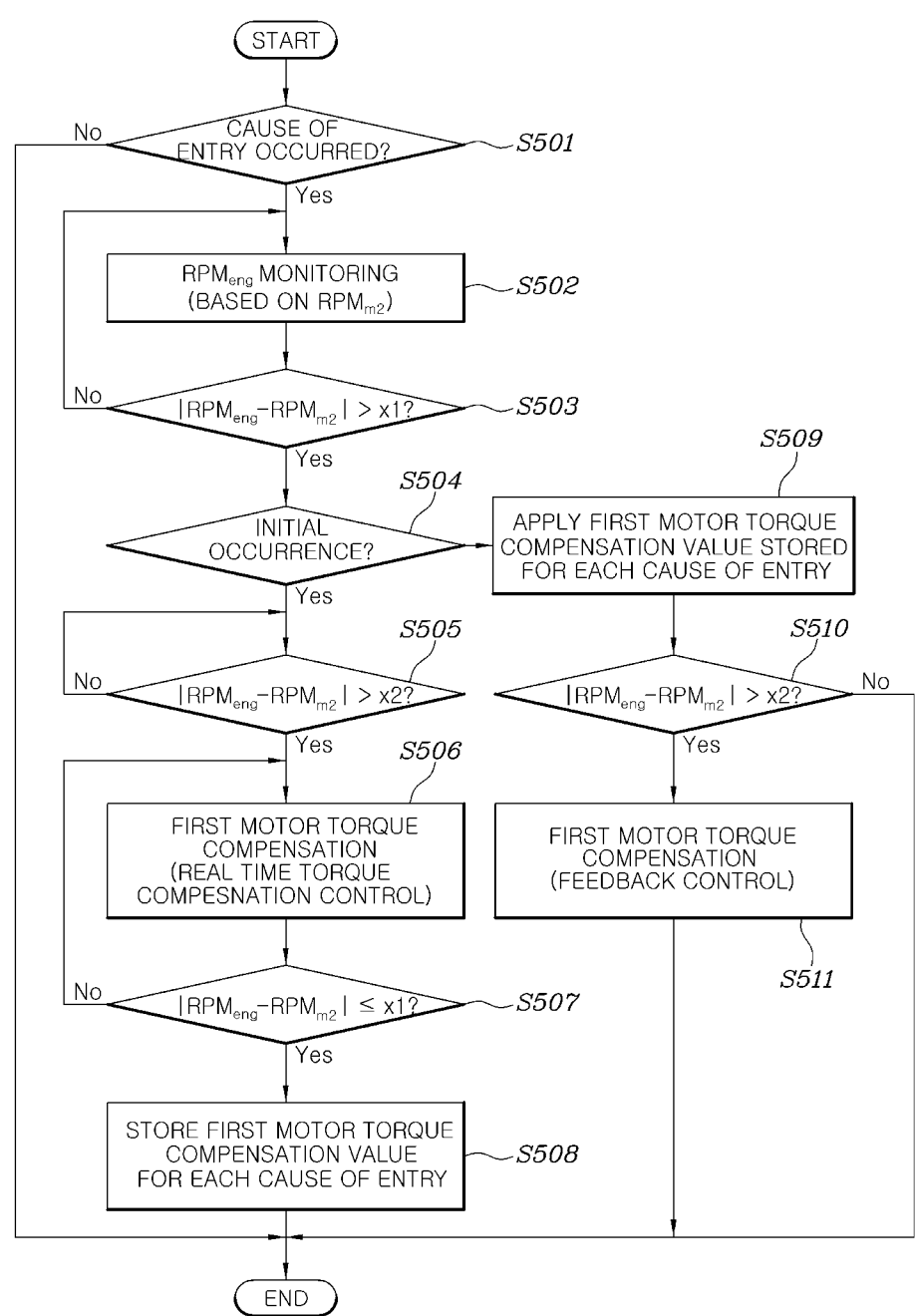
FIG. 5 a flowchart illustrating a method of controlling an engine speed according to an embodiment of the present disclosure.

Referring to FIG. 5, first, when the entry determining unit 310 determines the engine speed control entry when the cause of entry such as a request to stop or resume fuel injection, change in accelerator pedal operation occurs, and may request the monitoring unit 320 to monitor the engine 110 rotational speed (Yes in S501). The monitoring unit 320 constantly monitors the rotational speed of the engine 110, and in this case, the monitoring may be performed based on the rotational speed of the second motor 140 (S502). When the difference in rotational speed between the engine 110 and the second motor 140 during monitoring exceeds a predetermined first reference value (Yes in S503), the monitoring unit 320 may request the torque determining unit 330 to compensate for the output torque of the first motor 120.

If the first reference value of the difference in rotational speed between engine 110 and the second motor 140 is exceeded according to the cause of control entry (Yes in S504) for the first time, when the difference in rotational speed exceeds the second reference value (S505), the learning unit 340 compensates the output torque of the first motor 120 in real-time so that the difference in rotational speed is less than or equal to the first reference value (S506). When the difference in rotational speed is less than or equal to the first reference value as a result of torque compensation (Yes in S507), the learning unit 340 may store a torque value corresponding to the output torque of the first motor 120 at the same time of compensation and use such torque value as a compensation value (S508).

Thereafter, when the difference in rotational speed between the engine 110 and the second motor 140 according to the same cause of entry exceeds the first reference value again (No in S504). In other words, when it is determined that the difference in rotational speed has occurred, the torque determining unit 330 applies a compensation value corresponding to the cause of entry to pre-compensate the output torque of the first motor 120 to prevent the difference in rotational speed and the torsion and twisting (S509). However, when the difference in rotational speed exceeds the second reference value even with the output torque compensation of the first motor 120 (Yes in S510), the torque determining unit 330 additionally compensates the output torque of the first motor 120 so that the difference in rotational speed is less than the first reference value to respond to the occurrence of torsion and twisting (S511).

According to various embodiments as described above, in the case of a rotational speed of an engine and a motor connected to an engine through an engine clutch is mismatched in a hybrid electric vehicle, by controlling the rotational speed of the engine through a separate motor directly connected to the engine, the rotational speed of the engine and the motor connected thereof through the engine clutch is matched. Therefore, the feeling of steering system not working or controlled as intended is alleviated, and the durability of the vehicle may also be improved due to reduction in the torsion of shaft experienced between the engine and the motor.

The present disclosure mentioned in the foregoing description may be implemented as code that can be written to a computer-readable recording medium and can thus be read by a computer system. The computer-readable recording medium may include all kinds of recording devices in which data readable by a computer system is stored. Examples of computer-readable medium includes hard disk drive (HDD), solid state disk (SSD), silicon disk drive (SDD), ROM, RAM, CD-ROM, magnetic tape, floppy disk, optical data storage device, and the like. Therefore, the above embodiments are therefore to be construed in all aspects as illustrative and not restrictive. The scope of the present disclosure should be determined by the appended claims and their legal equivalents, not by the above description, and all changes coming within the meaning and equivalent range of the appended claims are intended to be embraced therein.

What is claimed is:

1. A method for controlling an engine speed of a hybrid electric vehicle, the method comprising:
   determining, when a first end of an engine is directly connected to a first motor while driving in a state where an engine clutch is locked-up and when a second motor is connected to a second end of the engine, a compensation value based on a difference in rotational speed of the engine and the second motor when a cause of control entry is occurred, which induces the rotational speed mismatch of the engine and the second motor;
   compensating an output torque of the first motor based on the compensation value,
   wherein the cause of control entry comprises a request to start a fuel injection,
   wherein determining the compensation value further comprises:
      storing, when the difference in rotational speed exceeds a second reference value greater than a predetermined first reference value during an initial engine speed control for each of the causes of control entry, the torque of the first motor such that the difference in rotational speed is less than or equal to the first reference value; and
      determining the stored torque as the compensation value; and
   terminating an output torque compensation of the first motor when a locked-up state of the engine clutch is opened.

2. The method according to claim 1, wherein the cause of control entry comprises a request to stop a fuel injection.

3. The method according to claim 1, wherein the cause of control entry comprises a change in an accelerator pedal control state.

4. The method according to claim 1, wherein the compensation value is determined by further considering the cause of control entry.

5. The method according to claim 4, wherein the compensation value is determined by further considering a predetermined value to correspond to a plurality of sections, which is the difference between the rotational speed of the engine and the rotational speed of the second motor.

6. The method according to claim 1, further comprising compensating the output torque of the first motor additionally so that the difference in rotational speed is less than or equal to the predetermined first reference value when the difference in rotational speed exceeds the second reference value which is greater than the first reference value as a result of compensating the output torque of the first motor by applying the compensation value.

7. A non-transitory computer-readable recording medium having a program recorded thereon, the program to direct a processor to perform acts of:
   determining, when a first end of an engine is directly connected to a first motor while driving in a state where an engine clutch is locked-up and when a second motor is connected to a second end of the engine, a compensation value based on a difference in rotational speed of the engine and the second motor when a cause of control entry is occurred, which induces the rotational speed mismatch of the engine and the second motor;

compensating an output torque of the first motor based on the compensation value, wherein the cause of control entry comprises a request to start a fuel injection, wherein determining the compensation value further comprises:

storing, when the difference in rotational speed exceeds a second reference value greater than a predetermined first reference value during an initial engine speed control for each of the causes of control entry, the torque of the first motor such that the difference in rotational speed is less than or equal to the first reference value; and determining the stored torque as the compensation value; and terminating an output torque compensation of the first motor when a locked-up state of the engine clutch is opened.

8. A hybrid electric vehicle comprising:

an engine clutch, of which a first motor directly connected to an engine at a first end and a second motor connected to a second end; and a control unit configured to determine, in a state where the engine clutch is locked-up, a compensation value based on a difference in a rotational speed between the engine and the second motor when a cause of control entry is occurred, which induces a rotational speed mismatch of the engine and the second motor and compensating an output torque of the first motor based on the compensation value, wherein the cause of control entry comprises a request to start a fuel injection, and wherein the control unit is further configured to:

store, when the difference in rotational speed exceeds a second reference value greater than a predetermined first reference value during an initial engine speed control for each of the causes of control entry, the torque of the first motor such that the difference in rotational speed is less than or equal to the first reference value; and determine the stored torque as the compensation value; and terminate an output torque compensation of the first motor when a locked-up state of the engine clutch is opened.

9. The vehicle according to claim 8, wherein the cause of control entry comprises a request to stop a fuel injection.

10. The vehicle according to claim 8, wherein the cause of control entry comprises a change in an accelerator pedal control state.

11. The vehicle according to claim 8, wherein the compensation value is determined by further considering the cause of control entry.

12. The vehicle according to claim 11, wherein the compensation value is determined by further considering a predetermined value to correspond to a plurality of sections, which is the difference between the rotational speed of the engine and the rotational speed of the second motor.

13. The vehicle according to claim 8, wherein the control unit is configured to compensate the output torque of the first motor additionally so that the difference in rotational speed is less than or equal to the predetermined first reference value when the difference in rotational speed exceeds the second reference value greater than the predetermined first reference value as a result of compensating the output torque of the first motor by applying the compensation value.

* * * * *